June 20, 1950 F. E. GAINES 2,512,148
SEALED WHEEL
Filed Aug. 13, 1948

INVENTOR:
FRANK E. GAINES
BY Huebner Maltby
and Beehler
ATTORNEYS.

Patented June 20, 1950

2,512,148

UNITED STATES PATENT OFFICE 2,512,148

SEALED WHEEL

Frank E. Gaines, Alhambra, Calif., assignor to Aerol Co. Inc., Los Angeles, Calif., a corporation of California Application August 13, 1948, Serial No. 44,111

11 Claims. (Cl. 308—16)

The invention relations to wheels and more especially wheels ordinarily designated as truck wheels of a type used on hand trucks, dolly trucks and similar vehicles.

The mechanism for providing smooth rolling wheels for ordinary hand trucks and similar vehicles has been reasonably well perfected to the extent that bearings, whether roller bearings or ball bearings, have reached a stage of design whereby their efficiency can be counted upon. Bearing races for roller bearings made of steel of the proper hardness and toughness and wherein the parts are carefully regulated as to tolerance can now be purchased on the open market. Modern industry has also turned its attention to the casting and pressing of wheels of this general sort in which bearing races can be incorporated for mounting upon the axle or shaft of the vehicle to produce a smooth rolling device.

Although the conventional bearing mounted wheel has been satisfactory for ordinary uses, there are occasions, however, where special circumstances exist in which the conventional bearing mounted wheel has been found unsatisfactory. Among such circumstances are packing houses, warehouses and plants of other descriptions handling food products. By this is meant not necessarily packaged food products but plants where food in open containers, and in the case of meat in the absence of any container at all, might have to be carried about on trucks equipped with bearing mounted wheels.

Under these last mentioned circumstances great stress is placed upon sanitation. At the close of every day every article of equipment used in handling food must be thoroughly and completely sterilized in order to comply with sanitary requirements, not only those laid down by governmental regulation but also from the point of pure sanitation so that there may be no accumulation of decay which would contaminate the products hauled about on the trucks.

The ordinary practice of sterilizing equipment includes a thorough washing and flooding of the apparatus with either hot water or steam under considerable pressure in company with strong soaps and detergents. Such practices very thoroughly sterilize the apparatus but are apt to have a serious deteriorating effect upon the equipment. The most satisfactory and economical bearings for wheels are made of steel of such high grade that it will very readily rust in the presence of water, steam or moisture in any form. Although it is true that when such bearings are packed with grease, the grease has a tendency to seal the surfaces of the bearings from contact with moisture, nevertheless, when such bearings are washed with hot water under pressure, with steam, and in company with strong alkalies, the grease packing soon becomes washed out baring the surfaces of the steel parts and under such extreme conditions rust rapidly accumulates and expensive bearing mounted wheels quickly deteriorate and become useless. Even though bearings of this nature may be packed and sealed in the ordinary way, such ordinary means of sealing is not sufficient to prevent the infiltration of moisture under the sanitary cleaning methods above referred to sufficient to prevent deterioration under those circumstances.

It is therefore among the objects of the invention to provide a new and improved wheel with a sealed bearing mechanism capable of blocking the infiltration of high pressure hot water and steam together with soaps and detergents.

Another object of the invention is to provide a new and improved wheel sealed on both sides to prevent ingress of moisture in any form and which may be thoroughly packed with grease so that the grease remains completely effective over long periods of time in the face of high pressure sanitary cleaning.

Still another object of the invention is to provide a new and improved wheel construction of simple design and inexpensive construction which is capable of effectively sealing the rolling parts of the bearings against high pressure sanitary cleaning methods.

A further object of the invention is to provide a new and improved wheel structure sufficiently versatile so that the wheel may be used with equal effectiveness whether placed upon the end of a shaft or at a location intermediate the ends.

With these and other objects in view, the invention consists in the construction, arrangement and combination of the various parts of the device whereby the objects contemplated are attained, as hereinafter set forth, pointed out in the appended claims and illustrated in the accompanying drawings.

Figure 1:
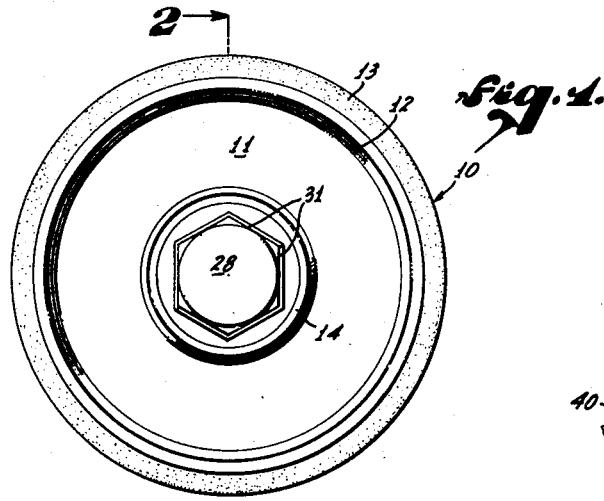
Figure 1 is a side elevational view of the wheel with all parts assembled.

In the embodiment chosen for the purpose of illustration there is shown a wheel 10 of a type suited for use on hand trucks and similar vehicles which includes a web 11, a rim 12, a rubber tread 13 and a hub 14. The wheel is designed to be mounted upon a shaft or axle 15.

Within the hub there is provided a chamber 20 of ample dimensions for the housing of two conventional roller bearing races. Each of the races comprises an outer ring 21, an inner ring 22 and a set of rollers 23. These are designed to be located by means of recesses 24 within the chamber 20 in position so that there is a substantial space for grease packing between the races.

On each side of the hub near the outside edge of the chamber 20 there is provided a threaded portion 25, the diameter and thread pitches being identical on each side. At the base of the threads is an annular recess 26 in each case in which is adapted to be positioned an O-ring 27 of synthetic rubber or other resilient packing material. On the right side of the wheel as viewed in Figure 2 there is provided a cap 28 having threads 29 adapted to engage the threads 25. At the inside end of the cap near the base of the threads is a rounded annular recess 30 complementary with respect to the recess 26 and adapted to cooperate with the recess 26 in order to seal in place the O-ring 27. The cap may be provided with hexagonal faces 31 for convenience in tightening the cap in place. Within the cap is a cavity 32 adapted to surround the end of the axle or shaft 15 and at the inside end of the cavity is an enlargement 33 which serves to enlarge the space for grease around the bearing race.

On the opposite side of the wheel is a hub seal ring 35 provided with threads 36 adapted to engage the threads 25 in the hub. The hub seal ring has an annular flanged portion 37 within which is a rounded annular recess 38. The inside of the hub seal is relieved as at 39 in order to expand to some extent a space for grease packing around the outside of the bearing race. Adjacent the hub seal is a spacing sleeve 40 which has an annular flange 41 at the end adjacent the bearing race in which is provided a rounded annular recess 42 adapted to cooperate with the recess 38 for the reception of an O-ring 43. The hub seal includes a curved annular recess 44 similar to the recess 30 of the cap which is adapted to cooperate with the annular recess 26 of the hub in order to effectively seal the joint with the aid of another O-ring 27.

Still another joint needs to be sealed for preventing liquid or moisture from traveling along the outer surface of the shaft thereby to reach the space inside of the hub of the wheel. For this additional seal there is provided a rounded annular recess 45 on the inside of the flange 41 which is adapted to contain an O-ring 46 and under proper circumstances to press the O-ring against the surface of the shaft and also against an end face of the adjacent bearing ring 22.

When the wheel is mounted the shaft is drilled with transverse holes 50 and 51 properly spaced with some degree of tolerance to accommodate the parts of the wheel. The bearing and hub seal together with the spacer sleeve 40 and appropriate O-rings may then be assembled and the wheel with its parts attached slid over the end of the shaft until the spacer sleeve 40 may be anchored in place by a pin 52. Apertures 53 may be provided in the hub seal to permit use of a spanner wrench for tightening the hub seal into position. From this description it will become apparent that the spacer sleeve 40 is fixed to and rotates with the shaft. Consequently the O-ring 46 will remain stationary inasmuch as the bearing ring 22 mounted upon the shaft also remains stationary. On the contrary, the hub seal is fixed with relation to the wheel which means that the hub seal will rotate with relation to the spacer sleeve. Consequently there will be movement of either the spacer sleeve or the hub seal with relation to the O-ring 43 and the recesses adjacent the O-ring must be made as smooth as possible in order to minimize wear upon the O-ring. Because of the fact, however, that material comprising the O-rings may be selected with respect to its characteristics, it is possible to use a material of the nature of Buna-N synthetic rubber which has a tendency to expand slightly in the presence of grease, thereby assuring the tightly packed joint.

To complete the mounting of the wheel the rings 21 and 22 comprising the other bearing race may then be inserted in place on the other side of the wheel. Depending upon the preciseness of location of the apertures 50 and 51, a shim washer 55 of selected thickness is added and finally an outer spacer sleeve 56 applied against the shim washer and spacer sleeve anchored in place by a pin 57. The clearance provided by the spacer sleeves, shim washer, and bearing rings 22 should be such that the fit is a freely rotating fit while at the same time providing as little as possible tolerance or freedom in an axial direction. After the parts above described have been properly placed, the cap 28 may be screwed into position finally sealing the grease packing interior by operation of the O-ring 27.

Figure 3:
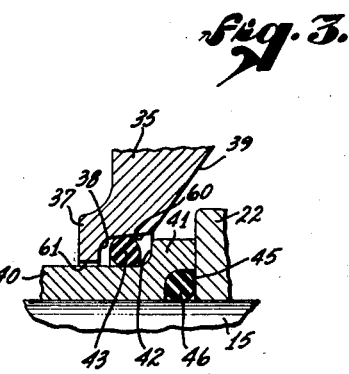
Figure 3 is a fragmentary sectional view of one portion of the sealing mechanism.

An examination of Figure 3 will reveal in greater detail the construction of the recesses 38 and 42. From this it will be apparent that a wall 60 of the recess 38 has a slight pitch so that there is a measurable wedging action against the O-ring 43. A clearance is provided at 61 so that there may at no time be any frictional contact between the hub seal 35 and the spacer sleeve 40. Further, by forming the recesses 38 and 42 somewhat greater in length than the diameter of the O-ring 43, compacting of the O-ring is avoided and the resiliency of the ring is depended upon to effect a sliding seal.

Figure 4:
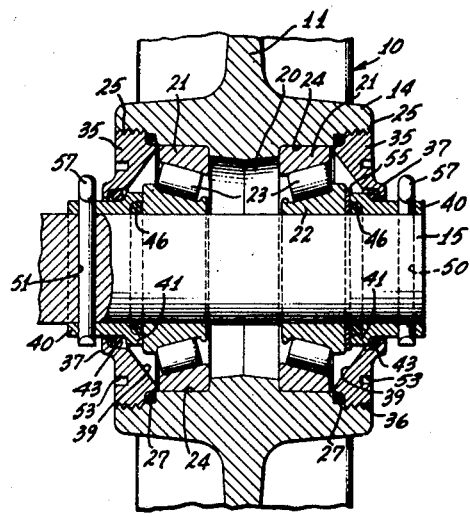
Figure 4 is a partial sectional view similar to Figure 2 but illustrating the wheel mounted intermediate the ends of a shaft rather than at the end.

In the form of the invention shown in Figure 4 the wheel is shown mounted without application of the cap 28. It will become evident from this figure that one or more wheels may be mounted upon the shaft if need be and also that a wheel may be mounted without a cap so that it can be located within a housing which might be too small if a cap were used.

Figure 2:
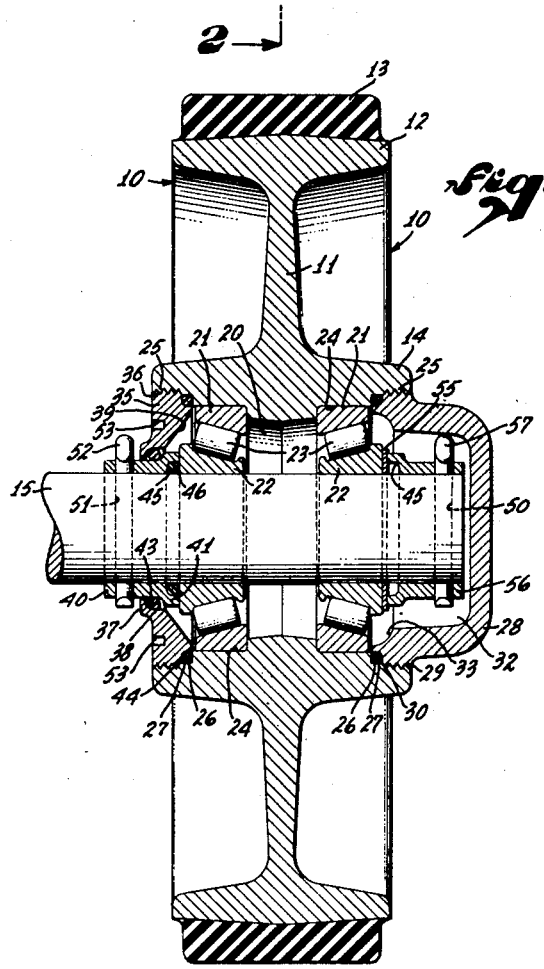
Figure 2 is a longitudinal sectional view of the wheel taken on the line 2—2 of Figure 1.

In this form the wheel 10 is identical to that described in the first embodiment. The only difference between Figures 2 and 4 is that in Figure 4 a structure like that involving the hub seal 35 described in connection with Figure 2 is used upon both sides of the device. Details with respect to the sealing effect of the O-rings and the recesses which contain them are the same for the members which comprise the sealing mechanism on both sides of the wheel. It is felt that this is sufficiently apparent so that the description in connection therewith need not be enlarged upon.

The structural details of the wheel have been described and also the manner of mounting the wheel upon a shaft or axle. The sealed portions comprising the O-rings can be drawn up sufficiently tightly by tightening either the hub seal or the cap into the hub of the wheel with sufficient force, thereby providing immovable moisture-proof and grease-proof seals at all points except for the O-ring 43. This O-ring while providing a grease-proof and moisture-proof seal is the only sliding packing in the wheel. Because of the structure of the recess 38 the interior of the hub may be packed solidly with grease and the O-ring by wedging itself within the recess 38 will prevent the grease from squeezing out through the movable sealing joint. The ring is equally effective in preventing ingress of soluble alkalies and detergents carried by either hot water or steam.

A sealed wheel of the type described may therefore be readily used upon trucks where sanitary conditions are imperative and the wheel may be thoroughly washed without likelihood of harmful ingredients reaching the bearing surfaces. Because of its structure, wheels of this type have a service life far greater than any other type of wheels under similar circumstances. Moreover, because of the relatively simple construction, wheels of this kind may be mounted upon trucks already in use equipped with conventional type wheels and the sealed wheel will be completely effective. Should the need arise, the sealed wheel can be readily separated with respect to its parts and removed for changing or replacement.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A sealed wheel having a rim, a hub and means connecting the rim and the hub, said hub having a central axial hub chamber extending therethrough, threaded recesses at the outside ends of the hub chamber, sealing members in threaded engagement with the threaded recesses and packing rings adapted to seal said threaded engagement, spacer sleeves at opposite sides of the chamber, bearing means engaging the spacer sleeves and a fixed annular seal between at least one spacer sleeve and the corresponding side of the bearing means, an annular seal between said one spacer sleeve and the adjacent sealing member, said sealing member and spacer sleeve having corresponding recesses greater in cross-sectional area than the cross-sectional area of the sealing ring.

2. A sealed wheel device for mounting upon the end of a horizontal axle comprising a wheel having a traction rim, a hub, means connecting the rim and the hub and an axial chamber within the hub, each side of said chamber having a threaded recess, bearing means in the chamber, a spacer sleeve on each side of the wheel fixed axially upon the axle having a flange extending toward the bearing means providing a packing recess, a resilient packing ring in one of the packing recesses on one side of the wheel, a hub seal ring threadedly engaging said threaded recess on said one side of the wheel, said hub seal ring having a packing recess and a resilient packing ring therein adapted to engage the threaded recess and another packing recess and a resilient packing ring in said last recess providing a sliding seal with the spacer sleeve, and a closure threadedly engaging the threaded recess on the other side of the wheel having an annular seal at the junction of the closure with the hub.

3. A sealed wheel mechanism for mounting upon the end of a horizontal axle comprising a wheel having a traction rim, a hub, means connecting the rim and the hub and an axial chamber through the hub, each side of said chamber having a threaded recess, a bearing recess smaller in diameter than the threaded recess, and a bearing means in each bearing recess, a spacer sleeve on each side of the wheel having a flange extending toward the bearing means providing a packing recess, a resilient packing in one of the packing recesses on one side of the wheel, means adapted to position the spacer sleeve relative to the bearing, a hub seal ring threadedly engaging said threaded recess having one packing recess and a resilient packing therein adapted to engage the bottom of the threaded recess and another packing recess and a resilient packing partially filling said last recess providing a sliding seal with the spacer sleeve, and a cap threadedly engaging the threaded recess on the other side of the wheel having a resilient sealing ring therefor.

4. A sealed wheel device for mounting upon the end of a horizontal axle comprising a wheel having a traction rim, a hub, means connecting the rim and the hub and an axial chamber within the hub, said chamber being similar in form on opposite sides of a transverse center plane, each side of said chamber having a threaded recess and a smooth walled shoulder at the bottom thereof, a stepped bearing recess smaller in diameter than the threaded recess and an innermost recess joining a corresponding innermost recess on the other side, a roller bearing in each bearing recess, a spacer sleeve on each side of the wheel having a flange extending toward the bearing and providing a packing recess therein, a resilient packing ring in the recess on one side of the wheel and pins adapted to position the spacer sleeves relative to the bearings, a hub seal ring threadedly engaging said threaded recess on said one side of the wheel, said hub seal ring having a packing recess and a resilient packing ring therein adapted to engage said smooth walled shoulder and another packing recess and a resilient packing ring therein partially filling said last recess providing a sliding seal with the spacer sleeve, and a cup threadedly engaging the threaded recess on the other side of the wheel having a resilient sealing ring at the edge thereof engaging the corresponding smooth walled shoulder.

5. A sealed wheel mechanism for mounting upon a horizontal axle comprising a wheel having a traction rim, a hub, means connecting the rim and the hub and an axial chamber within the hub, each side of said chamber having a threaded recess, bearing means in the chamber, a spacer sleeve on each side of the wheel fixed axially upon the axle, said sleeve having a sealed contact with the bearing means, and a hub seal ring on each side threadedly engaging the threaded recess having a sealed contact with the hub, said hub seal ring having a sliding seal relationship with the respective spacer sleeve.

6. A sealed wheel mechanism for mounting upon a horizontal axle comprising a wheel having a traction rim, a hub, means connecting the rim and the hub and an axial chamber through the hub, each side of said chamber having a threaded recess and a shoulder at the bottom thereof, a bearing member in each side of said chamber, a spacer sleeve on each side of the wheel providing a packing recess adjacent the bearing member, a resilient packing ring in the recess and means adapted to position the spacer sleeve relative to the bearing, a hub seal ring threadedly engaging each threaded recess, a resilient packing between the hub seal ring and the hub, said hub seal ring having a recess and a resilient packing ring therein partially filling said last recess providing thereby a sliding seal with the spacer sleeve.

7. A sealed wheel mechanism for mounting upon a horizontal axle comprising a wheel having a traction rim, a hub, means connecting the rim and the hub and an axial chamber through the hub, said chamber being similar in form on opposite sides of a transverse center plane, each side of said chamber having a threaded recess and a smooth walled shoulder at the bottom thereof, a stepped bearing recess smaller in diameter than the threaded recess and an innermost recess joining a corresponding innermost recess on the other side, a roller bearing in each bearing recess, a spacer sleeve on each side of the wheel having a flange extending toward the bearing and providing a packing recess therein, a resilient packing ring in each said packing recess and means adapted to position each spacer sleeve relative to the bearing, a hub seal ring threadedly engaging each threaded recess having a packing recess and a resilient packing ring therein adapted to engage the corresponding smooth walled shoulder, said hub seal ring having another packing recess and a resilient packing ring therein partially filling said last recess providing thereby a sliding seal with the respective spacer sleeve.

8. A rotating seal comprising an axle, a sleeve fixed on the axle having an outer annular face, a seal ring having a face surrounding the sleeve and rotatable with respect thereto, said face having a recess therein comprising an annular wall and a rounded inner end wall, the sleeve face having a complementary recess comprising an annular wall and a rounded end wall, and an annular resilient ring smaller in cross-sectional width than the space between the end walls of said recesses and having an outside diameter not less than the diameter of the seal ring recess and an inside diameter not greater than the diameter of the sleeve recess.

9. A rotating seal comprising an axle, a sleeve fixed on the axle having an outer annular face, a seal ring having a face surrounding the sleeve and rotatable with respect thereto, said face having a recess therein comprising an annular wall pitched radially outward toward an open end and a rounded inner end wall, the sleeve face having a complementary recess comprising an annular wall and a rounded end wall, and an annular resilient ring smaller in cross-sectional width than the space between the end walls of said recesses and having an outside diameter not less than the diameter at the largest end of the seal ring recess and an inside diameter not greater than the diameter of the sleeve recess.

10. A rotating seal comprising an axle, a sleeve fixed on the axle, a seal ring having a face surrounding the sleeve and rotatable with respect thereto, said face having a recess therein comprising an annular wall pitched radially outward toward an open end and a rounded inner end wall, said sleeve having a complementary recess comprising an annular wall and a rounded end wall, and an annular resilient ring smaller in cross-sectional area than the area formed by said recesses and having an outside diameter not less than the diameter at the largest end of the first recess and an inside diameter not greater than the diameter of the second recess.

11. A rotating seal comprising an axle, a bearing thereon including a bearing race fixed on the axle, a sleeve fixed on the axle adjacent the bearing race having an outer annular face, there being a rounded closed annular pocket formed at the junction of the sleeve wtih the adjacent side of the bearing race and a resilient sealing element in the closed annular pocket, a seal ring having a face surrounding the sleeve and rotatable with respect thereto, said face of the seal ring having a recess therein comprising an annular wall pitched radially outward toward an open end and a rounded inner end wall, said sleeve having a complementary recess in the face thereof comprising an annular wall and a rounded end wall, and an annular resilient ring smaller in cross-sectional area than the area formed by said recesses and having an outside diameter not less than the diameter at the largest end of the recess in the seal ring and an inside diameter not greater than the diameter of the recess in the sleeve.

FRANK E. GAINES.

REFERENCES CITED

The following references are of record in the file of this patent:

UNITED STATES PATENTS

| Number | Name | Date |
|---|---|---|
| 1,186,033 | Perks | June 6, 1916 |
| 2,285,870 | Parker | June 9, 1942 |
| 2,312,361 | Sanford | Mar. 2, 1943 |

FOREIGN PATENTS

| Number | Country | Date |
|---|---|---|
| 25,671 | Great Britain | 1913 |